United States Patent [19]

Klinkenberg

[11] Patent Number: 5,178,029
[45] Date of Patent: Jan. 12, 1993

[54] BALL SCREW SEAL
[75] Inventor: Hubert E. Klinkenberg, Rochester Hills, Mich.
[73] Assignee: Dana Corporation, Toledo, Ohio
[21] Appl. No.: 757,377
[22] Filed: Sep. 10, 1991
[51] Int. Cl.⁵ .............................................. F16H 25/22
[52] U.S. Cl. ................................. 74/424.8 R; 74/459
[58] Field of Search ................ 74/89.15, 424.8 R, 459
[56] References Cited

U.S. PATENT DOCUMENTS

| | | | |
|---|---|---|---|
| 3,116,931 | 1/1964 | Edwards | 277/165 |
| 3,669,460 | 6/1972 | Wysong | 277/165 X |
| 3,975,968 | 8/1976 | Chaffin | 74/424.18 R X |
| 4,052,076 | 10/1977 | Wysong | 277/24 |
| 4,148,226 | 4/1979 | Benton | 74/89.15 X |
| 4,226,431 | 10/1980 | Jelinek et al. | 277/165 |
| 4,258,584 | 3/1981 | Haegele et al. | 74/89.15 X |
| 4,286,793 | 9/1981 | Ploss et al. | 277/165 |
| 4,557,156 | 12/1985 | Teramachi | 74/424.8 R X |
| 4,604,911 | 8/1986 | Teramachi | 74/424.8 R |
| 4,881,419 | 11/1989 | Weyer | 74/89.15 |
| 4,905,533 | 3/1990 | Benton et al. | 74/459 |
| 4,955,244 | 9/1990 | Katahira | 74/89.15 |

Primary Examiner—Allan D. Herrmann
Attorney, Agent, or Firm—Dykema Gossett

[57] ABSTRACT

A seal for use in a ball screw assembly sealingly engages portions of both the nut and the screw. The seal has a plurality of teeth at an outer peripheral surface, and further has a seal thread received in a thread on the screw. The seal is rotated relative to the nut and moves axially due to the screw thread until a seal face sealingly engages the nut. A set screw is then inserted through the nut, into a space formed between adjacent teeth on the seal, to prevent further relative rotation of the seal and the nut. A force from the nut on the seal urges the seal axially such that the seal thread is biased into the screw thread, providing sealing contact between the seal thread and the screw thread.

21 Claims, 2 Drawing Sheets

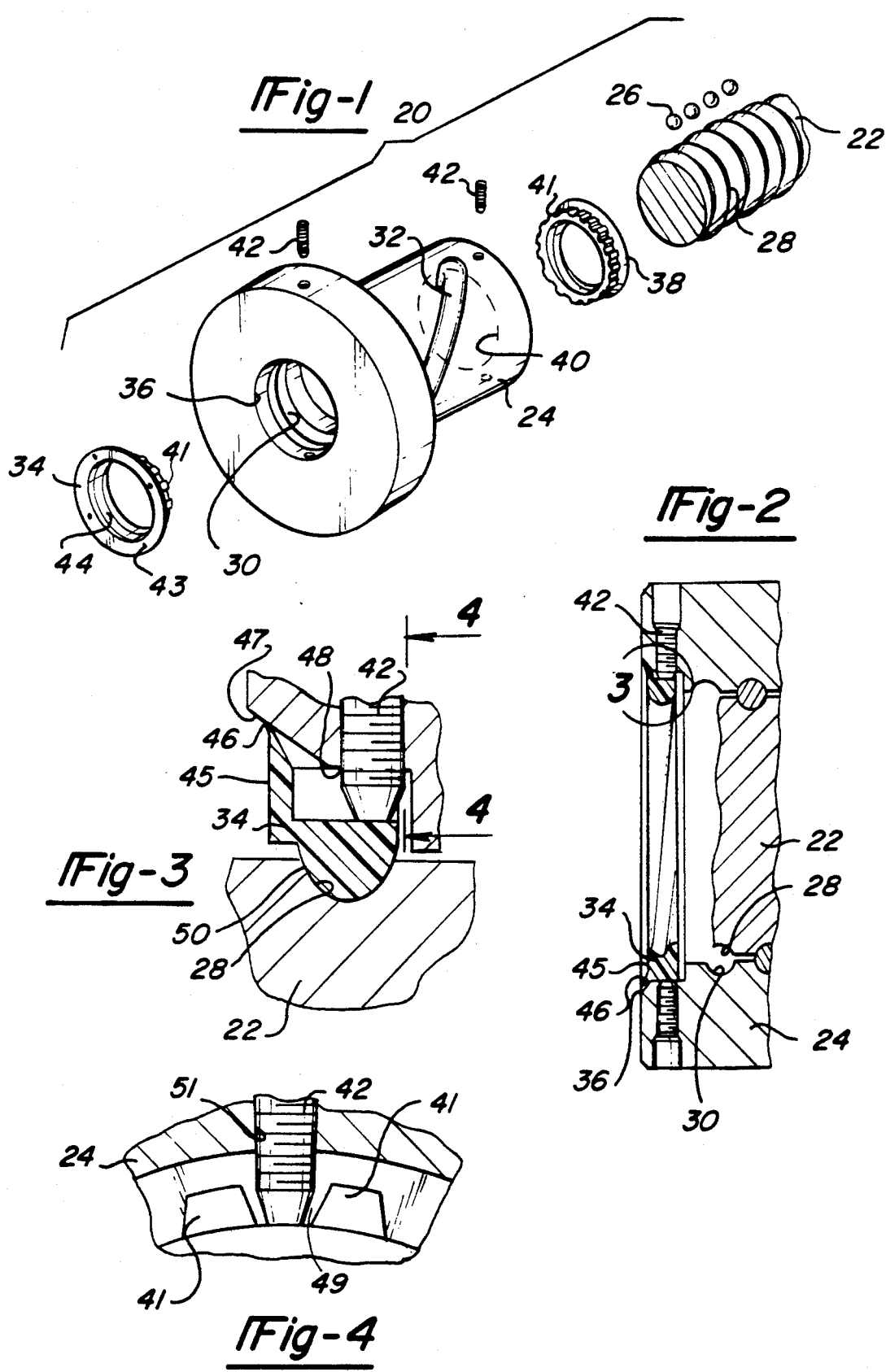

BALL SCREW SEAL

BACKGROUND OF THE INVENTION

This invention relates to a seal which engages both the screw and nut in a ball screw assembly.

Known ball screw assemblies include an internally threaded nut positioned on an externally threaded screw. A plurality of balls received in a space defined between the inner and outer threads guide relative movement between the nut and screw. Ball screw assemblies are typically used to control precision movement, and it is important to ensure that they operate smoothly and properly. To this end, it is necessary to seal the space between the nut and screw to prevent lubricant from escaping, and to prevent the influx of foreign particles.

Due to the complex, relatively moving surfaces between the external thread on the screw and an inner peripheral surface of the nut, it has proven somewhat difficult to seal the space between the nut and screw. The prior art has used a seal with a seal thread disposed in the screw thread. There is clearance between the seal thread and the screw thread, and the seal is closely spaced from a inner peripheral surface of the nut. This type of prior art seal has not positively engaged and sealed a surface of either the nut or the screw.

SUMMARY OF THE INVENTION

A ball screw assembly is disclosed having a seal disposed in a seal bore at each axial end of a nut. Each seal has a thread at an inner peripheral surface received in a thread at the outer peripheral surface of a screw. A seal body is forced into sealing contact with an inner peripheral surface of the nut, and the seal thread is forced into sealing contact with the screw thread.

A seal force between the nut and seal is adjusted by rotating the seal relative to the nut. The seal moves axially relative to the nut, since it rides in the screw thread, and is forced against the nut inner peripheral surface. Once the seal has moved into sealing contact with the nut, the seal is fixed against further rotation relative to the nut. The seal is still free to move a small axial amount relative to both the nut and screw. A reaction force directed from the nut against the seal, forces the seal axially outwardly of the seal bore, such that the seal thread is forced into the screw thread. Opposed forces between the screw and seal, and the nut and seal, equalize such that the seal reaches an equilibrium position. Once in the equilibrium position, the seal moves with the nut, and rotates relative to the screw. The seal may be fixed in any one of several rotated positions relative to the nut to provide close control over the position of the seal. The selection of a particular rotated position provides a desired seal force, and adequate sealing contact with both the nut and the screw.

These and other features of the present invention can be best understood from the following specification and drawings, of which the following is a brief description.

BRIEF DESCRIPTION OF THE DRAWINGS

FIG. 1 is an exploded view of a ball screw assembly according to the present invention.

FIG. 2 is a partial cross-sectional view through the ball screw assembly illustrated in FIG. 1.

FIG. 3 is an enlarged view of the portion of FIG. 2 identified by line 3.

FIG. 4 is a cross-sectional view along line 4-4 as shown in FIG. 3.

DETAILED DESCRIPTION OF A DISCLOSED EMBODIMENT

Figure 5:
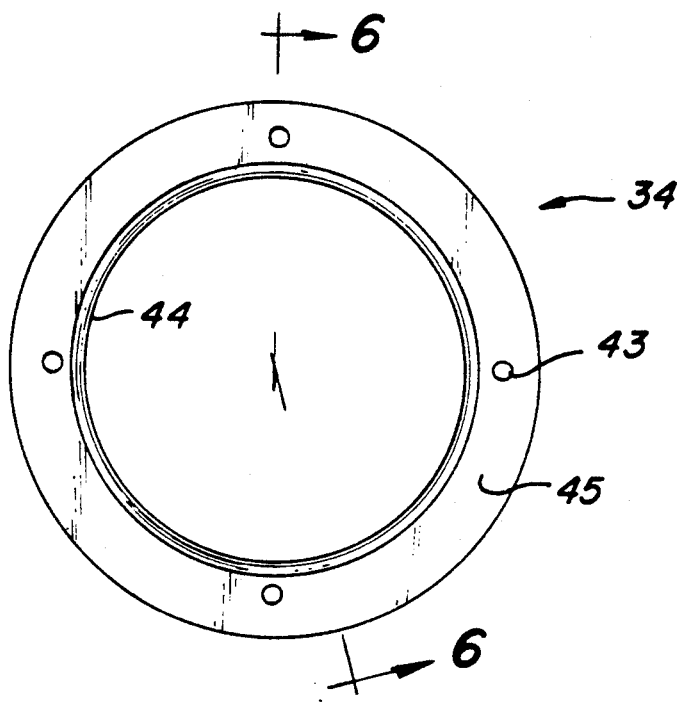
FIG. 5 is an end view of a seal according to the present invention.

A ball screw assembly 20 illustrated in FIG. 1 includes a screw 22 which receives a nut 24. As is commonly known, a plurality of balls 26 ride in an outer thread 28 on screw 22, and in an inner thread 30 in nut 24. Screw 22 and nut 24 move relative to each other, and balls 26 move within a space defined by threads 28 and 30 between axial ends of nut 24. As balls 26 reach one axial end of nut 24 they are returned to the opposed axial end through a return tube 32.

An end seal 34 is disposed within a seal bore 36 extending axially inwardly from one axial end of nut 24. A second end seal 38 is disposed in a similar seal bore 40 at the opposed axial end of nut 24. A plurality of teeth 41 are formed at outer peripheral surfaces on seals 34 and 38. As will be described below, set screws 42 are inserted between adjacent teeth 41 to secure seals 34 and 38 at a desired rotated position relative to nut 24. Tool holes 43 receive a wrench to facilitate rotation of seals 34 and 38 within bores 36 and 40 for a purpose which will be described below.

The mounting and construction of seal 34 and 38 is identical, and thus only seal 34 is described in detail. As shown in FIG. 2, seal 34 includes a sealing face 45 extending radially outwardly to a tip 46 which abuts an inner peripheral surface of nut 24. A portion of screw 22 adjacent seal 34 is removed in FIG. 2 to better illustrate the internal structure of seal 34. The removed screw portion is shown in FIG. 3. A seal thread 44 is formed in an inner peripheral surface of seal 34, and is received within screw thread 28, see FIG. 3. There is a slight clearance between seal thread 44 and screw thread 28, and seal thread 40 may thus move through a limited extent along the axis of screw 22.

The sealing engagement of seal 34 will be described with reference to FIG. 3. Seal bore 36 is defined by a frustoconical portion 47 of a nut inner peripheral surface and a generally cylindrical portion 48 spaced axially inwardly of seal bore 36 from frustoconical portion 47. Tip 46 is also frustoconical, and sealingly engages frustoconical portion 47 to define a nut seal contact area.

Seal 34 is resilient, and tip 46 is forced axially into tapered portion 47 such that a reaction force is directed from nut 24 into seal 34. This forces seal 34 axially outwardly of seal bore 36, such that seal thread 44 is forced against screw thread 28 at a screw seal contact area 50. A reaction force from screw thread 28 against seal thread 44 forces seal 34 axially inwardly of seal bore 36. The forces between nut 24 and seal 34, and screw thread 28 and seal 34 equalize such that seal 34 reaches an equilibrium position.

During operation of ball screw assembly 20, seal 34 moves with nut 24 and relative to screw 22. There is sealing engagement between nut 24 and seal 34 at the nut seal contact area, which is generally frustoconical. Further, there is sealing engagement at screw seal contact area 47 between screw thread 28 and seal thread 44, which is generally a helical portion.

As shown in FIG. 4, set screw 42 extends radially through an aperture 51 in nut 24 into a space 49 formed between adjacent teeth 41. Set screw 42 secures seal 34 at a desired rotated position relative to nut 24, but allows limited relative axial movement. The radially innermost portion of set screw 42 is of a circumferential dimension slightly smaller than the circumferential dimension of space 49. Thus, there is no binding friction between teeth 41 and set screw 42 when there is relative axial movement between seal 34 and nut 24. Alternatively, the sides of adjacent teeth 41 may meet at a point such that spaces 49 have a generally triangular cross-section.

As shown in FIG. 5, seal 34 has seal face 45 at one axial end. Seal thread 44 is formed at an inner peripheral surface. Four tool holes 43 are spaced about seal face 45.

Figure 6:
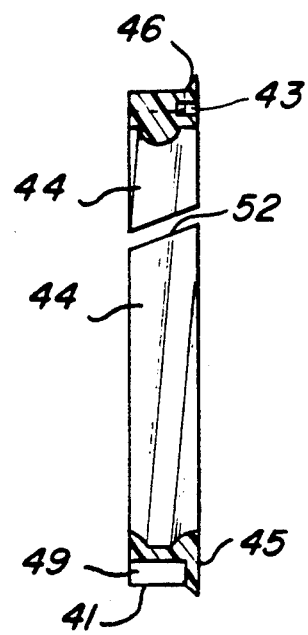
FIG. 6 is a cross-section view along line 6—6 as shown in FIG. 5.

As shown in FIG. 6, seal face 45 extends radially outwardly to tip 46. Teeth 41 are axially spaced from seal face 45. An optional slot 52 may be formed across seal 34, such that seal 34 is non-continuous. Slot 52 facilitates placement of seal 34 on screw thread 28, and would preferably extend non-parallel to the axis of seal 34 and through seal thread 44.

Figure 7:
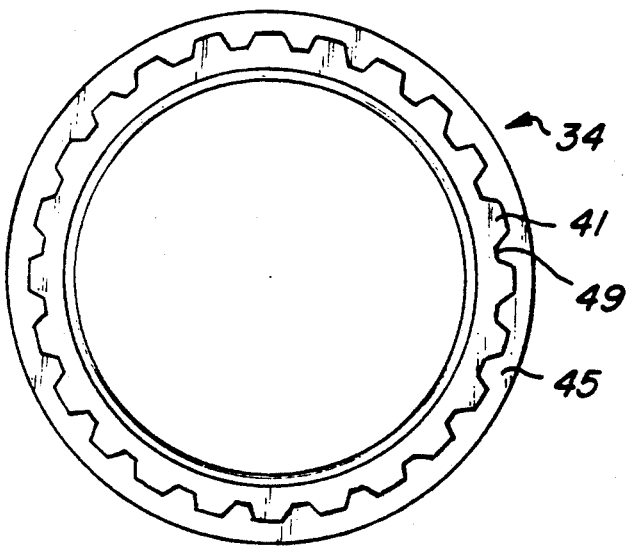
FIG. 7 is a view of an opposed end of the seal illustrated in FIG. 5.

As shown in FIG. 7, teeth 41 are spaced about the entire outer periphery of seal 34. Preferably, a relatively large number of teeth are formed such that the circumferential spacing between centerlines of adjacent spaces 49 is less than 20 degrees.

A method of providing sealing contact between seal 34 and both nut 24 and screw 22 will now be described with reference to FIG. 1-7. Set screw 42 is removed. Seal 34 is placed within screw thread 28, and is turned until it enters seal bore 36. Seal 34 is then rotated relative to screw 22 and nut 24. Seal thread 44 moves through screw thread 28, and seal 34 moves axially inwardly relative to nut 24. Frustoconical tip 46 of seal 34 is urged into sealing contact with frustoconical portion 48 of nut 24 as seal 34 moves further into seal bore 36. Preferably, a wrench having pins inserted into tool holes 43 facilitates the rotation of seal 34.

Seal 34 is rotated until tip 46 abuts frustoconical portion 48 with a desired force. Set screw 42 is then inserted into the space 49 most adjacent to aperture 51. Seal 34 is thus retained against rotation relative to nut 24, although it may still move axially. A reaction force directed from nut 24 against seal 34 causes seal 34 to move slightly axially outwardly of seal bore 36. As seal 34 moves axially, seal thread 44 is forced into screw thread 28 at screw seal contact area 50. Seal 38 at the opposed seal bore 40 is assembled in a similar fashion.

In this way, seal 34 provides positive sealing contact areas between both nut 24 and screw 22. Further, an operator may easily adjust the sealing force between seal 34, nut 24 and screw 22 by changing the relative rotational position of seal 34 and nut 24. Due to the large number of teeth 41, an operator can achieve fine control over the relative position of seal 34 and nut 24. Since seal 34 may move slightly axially, or float, relative to both nut 24 and screw 22, the position of the seal adjusts for manufacturing tolerances in screw thread 28 and seal thread 44.

By increasing the number of teeth 41, the degree of control over the position of seal 34 relative to nut 24 is also increased. The amount of seal movement achieved by turning seal 34 relative to nut 24 through one space 49 equals the circumferential spacing between adjacent teeth, multiplied by the lead of the screw thread, and then divided by 360 degrees. Thus:

Movement = (Circumferential Spacing) (Lead)/360°

With a seal 34 having forty teeth 41, the circumferential space between adjacent spaces 49 is 9 degrees. If the lead were 5 mm then the movement would be 0.125 millimeter. Thus, a fine degree of control over the position of seal 34 is achievable. Preferred embodiments have 24 teeth, 36 teeth or 40 teeth.

The adjustment of seal 34 relative to nut 24 may be used to achieve a desired minimum clearance between seal 34, nut 24, and screw thread 28 rather than a seal. To this end, the initial adjustment of seal 34 relative to nut 24 would end prior to seal 34 engaging an inner peripheral surface of nut 24.

The seal is preferably formed of a glass filled nylon. A nylon available under the tradename Zytle 70G13L may be used.

A preferred embodiment of the present invention has been disclosed. A worker of ordinary skill in the art, however, would recognize that certain modifications would come within the scope of the invention. Thus, the following claims should be studied in order to determine the true scope and content of the invention.

I claim:

1. A ball screw assembly comprising:
   a screw extending along an axis and having a screw thread at an outer peripheral surface;
   a nut extending along said axis and having two axial ends, said nut received on said screw and having a nut thread at an inner peripheral surface and extending between two nut thread axial ends;
   a seal bore extending axially inwardly from at least one axial end of said nut, a seal disposed in said seal bore and being free to move axially relative to said nut, said screw and said screw thread, means for urging said seal into sealing contact with an inner peripheral surface of said nut at a nut seal contact area which is spaced axially outwardly of said nut thread axial end, and said seal having a seal thread at an inner peripheral surface which is received in said screw thread, said means for urging also urging said seal thread into sealing contact with said screw thread at a screw seal contact area; and
   wherein said nut seal contact area is positioned axially outwardly of said thread seal contact area.

2. A ball screw assembly as recited in claim 1, wherein said nut seal contact area is generally frustoconical, and said screw seal contact area is a generally helical segment.

3. A ball screw assembly as recited in claim 1, wherein a second seal is disposed at a second axial end of said nut, and each said seal is forced into sealing contact with both said nut and said screw.

4. A ball screw assembly as recited in claim 1, wherein said means for urging generates a first reaction force directed from said nut into said seal at said nut seal contact area in a first direction, and said first reaction force generates a second reaction force is directed from said screw into said seal at said screw seal contact area in a second direction, said first direction having a component directed axially outwardly of said seal bore and said second direction having a component directed axially inwardly of said seal bore.

5. A ball screw assembly as recited in claim 4, wherein said nut inner peripheral surface has a frusto-conical portion extending axially and radially inwardly from said at least one axial end of said nut to define a portion of said bore, and said seal has a seal face extending radially outwardly to contact said conical portion and provide said nut seal contact area.

6. A ball screw assembly as recited in claim 1, wherein said seal has a plurality of teeth at an outer peripheral surface, spaces being formed between said teeth, and a set screw extends from said nut into one of said spaces to prevent relative rotation between said seal and said nut.

7. A ball screw assembly as recited in claim 6, wherein said seal has a seal face spaced axially outwardly of said bore relative to said plurality of teeth, said seal face having a radially outer tip which sealingly engages said inner peripheral surface of said nut to define said nut seal contact area.

8. A ball screw assembly as recited in claim 7, wherein said nut inner peripheral surface has a frusto-conical portion extending axially and radially inwardly from said at least one axial end of said nut to define a portion of said bore, and said nut seal contact area is within said conical portion.

9. A ball screw assembly as recited in claim 8, wherein said radially outer tip is conical, and sealingly engages said conical portion.

10. A ball screw assembly as recited in claim 8, wherein an axial end of said seal face has a plurality of holes to facilitate insertion of a tool to aid in rotation of said seal relative to said nut.

11. A ball screw assembly as recited in claim 6, wherein an axial face of said seal has a plurality of holes to facilitate insertion of a tool to aid in rotation of said seal relative to said nut.

12. A ball screw assembly as recited in claim 6, wherein centerlines of said spaces are circumferentially spaced by less than 20 degrees.

13. A ball screw assembly as recited in claim 1, wherein there are means to adjust the force between said seal and said nut at said nut seal contact area.

14. A ball screw assembly as recited in claim 1, wherein there are means to secure said seal at any one of a plurality of circumferential locations relative to said nut.

15. A seal for use in a ball screw assembly comprising:
  a seal body having an inner peripheral surface defining a central bore, said seal body extending along an axis between first and second axial ends, a seal thread formed on said inner peripheral surface;
  a seal face extending radially outwardly of the remainder of said seal body at said first axial end of said seal body; and
  a plurality of teeth spaced circumferentially about an outer peripheral surface of said seal body, and extending axially between said seal face and said second axial end, and spaces defined between adjacent teeth, and wherein centerlines of said spaces are circumferentially spaced by less than 20 degrees.

16. The seal as recited in claim 15, wherein said spaces are formed about the entire outer peripheral surface of said seal body.

17. A ball screw assembly comprising:
  a screw extending along an axis and having a thread at an outer peripheral surface;
  a nut extending along said axis and having two axial ends, said nut received on said screw and having a thread at an inner peripheral surface;
  a seal bore extending axially inwardly from at least one axial end of said nut, a seal disposed in said seal bore and being free to move axially relative to said nut and said screw, and means to secure said seal at any one of a plurality of circumferential locations relative to said nut;
  said means to secure said seal include a plurality of teeth at an outer peripheral surface of said seal, spaces defined between said teeth, and a set screw extending from said nut into one of said spaces to prevent relative rotation of said seal and said nut, such that said seal may be turned relative to said nut to any one of a plurality of circumferential positions to adjust a force urging said seal into said nut, and then secured at a desired one of said circumferential locations by inserting said set screw into a selected one of said spaces.

18. A ball screw assembly as recited in claim 17, wherein centerlines of said spaces are circumferentially spaced by less than 20 degrees.

19. A ball screw assembly as recited in claim 17, wherein said seal in non-continuous and a slot extends through it at an angle which is non-parallel to said axis.

20. A method of assemblying a ball screw assembly comprising the steps of:
  1) placing a seal on a screw, the seal having a seal thread received in a screw thread on the screw, and inserting the seal into a seal bore in a nut;
  2) rotating the seal relative to the nut such that the seal thread moves within the screw thread, and the seal moves axially relative to the nut until the seal reaches a desired axial position relative to the nut;
  3) securing the seal against any further rotation relative to the nut; and
  4) the rotation of step 2) is accomplished by inserting a tool into holes in an outer axial face of the seal and using the tool to rotate the seal relative to the nut.

21. The method as recited in claim 20, wherein the desired axial position is selected such that the seal contacts an inner peripheral surface of the nut.

* * * * *